United States Patent
Ayatsuka et al.

(10) Patent No.: US 9,825,998 B2
(45) Date of Patent: Nov. 21, 2017

(54) ELECTRONIC UNIT, COMMUNICATION SYSTEM AND METHOD, INFORMATION PROCESSING TERMINAL AND METHOD, AND INFORMATION PROCESSING APPARATUS AND METHOD

(75) Inventors: Yuji Ayatsuka, Tokyo (JP); Nobuyuki Matsushita, Tokyo (JP)

(73) Assignee: Sony Corporation, Tokyo (JP)

(*) Notice: Subject to any disclaimer, the term of this patent is extended or adjusted under 35 U.S.C. 154(b) by 1968 days.

(21) Appl. No.: 10/250,341

(22) PCT Filed: Oct. 28, 2002

(86) PCT No.: PCT/JP02/11168
§ 371 (c)(1),
(2), (4) Date: Oct. 12, 2004

(87) PCT Pub. No.: WO03/039075
PCT Pub. Date: May 8, 2003

(65) Prior Publication Data
US 2005/0066039 A1    Mar. 24, 2005

(30) Foreign Application Priority Data
Nov. 1, 2001 (JP) .................................. 2001-336536

(51) Int. Cl.
*H04L 12/28* (2006.01)
*H04L 12/24* (2006.01)
(Continued)

(52) U.S. Cl.
CPC .......... *H04L 65/1069* (2013.01); *H04L 41/12* (2013.01); *H04N 5/268* (2013.01);
(Continued)

(58) Field of Classification Search
CPC .................................................. H04L 2209/80
(Continued)

(56) References Cited

U.S. PATENT DOCUMENTS 6,735,628 B2 * 5/2004 Eyal ............................. 709/223
6,822,971 B1 11/2004 Mikkonen
(Continued)

FOREIGN PATENT DOCUMENTS

EP 1 059 791 A2 12/2000
JP 1-95847 6/1989
(Continued)

OTHER PUBLICATIONS

Connection Handover Technical Specification, NFC Forum Connection Handover 1.1, NFCForum-TS-Connection Handover_1.1, Nov. 6, 2008 (43 pages).

*Primary Examiner* — Adnan Mirza
(74) *Attorney, Agent, or Firm* — Paratus Law Group, PLLC

(57) ABSTRACT

The present invention relates to electronic units, communication systems and methods, information processing terminals and methods, and information processing apparatuses and methods which allow easy and quick communications. When a link pin 21A is inserted into a VCR 3, the VCR 3 reads the pin ID stored in the RF tag of the link pin 21A, and reports the pin ID and the address to a management server 1. When the management server 1 has already obtained the pin ID of a link pin 21B read by a television receiver 5, the management server 1 determines whether the group ID included in the pin ID reported by the VCR 3 is the same as the group ID included in the pin ID reported by the television receiver 5. When the management server 1 determines that they are the same, the management server 1 connects the VCR 3 to the television receiver 5. The present invention can be applied to various types of information processing apparatuses connected to a network.

19 Claims, 14 Drawing Sheets

(51) Int. Cl.
*H04L 29/06* (2006.01)
*H04N 5/268* (2006.01)
*H04W 4/00* (2009.01)

(52) U.S. Cl.
CPC .. *H04L 12/2807* (2013.01); *H04L 2012/2849* (2013.01); *H04W 4/008* (2013.01)

(58) Field of Classification Search
USPC .................................. 709/225, 228; 370/386
See application file for complete search history.

(56) References Cited

U.S. PATENT DOCUMENTS

| | | | |
|---|---|---|---|
| 7,134,131 B1* | 11/2006 | Hendricks et al. | 725/31 |
| 2003/0039256 A1* | 2/2003 | Carlberg et al. | 370/395.64 |
| 2004/0002346 A1* | 1/2004 | Santhoff | 455/456.1 |
| 2004/0039818 A1* | 2/2004 | Nakaminami et al. | 709/225 |

FOREIGN PATENT DOCUMENTS

| | | |
|---|---|---|
| JP | 7-30971 | 1/1995 |
| JP | 11-205357 | 7/1999 |
| JP | 2001-142825 | 5/2001 |

\* cited by examiner

FIG. 2
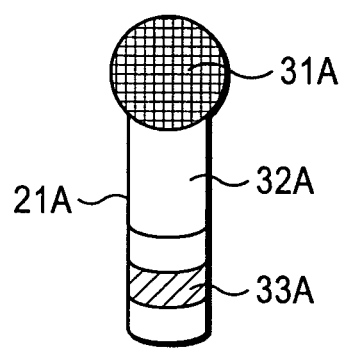
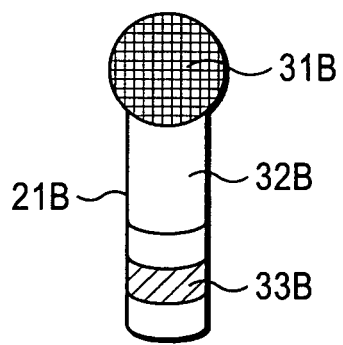

FIG. 6

| | | |
|---|---|---|
| | GROUP ID | "pin 00001" |
| | | ADDRESS |
| CLIENT 1 (VCR) | | 255 : 255 : 255 : 254 |
| CLIENT 2 (TV) | | 255 : 255 : 255 : 255 |

ELECTRONIC UNIT, COMMUNICATION SYSTEM AND METHOD, INFORMATION PROCESSING TERMINAL AND METHOD, AND INFORMATION PROCESSING APPARATUS AND METHOD

TECHNICAL FIELD

The present invention relates to electronic units, communication systems and methods, information processing terminals and methods, and information processing apparatuses and methods, and more particularly, to electronic units, communication systems and methods, information processing terminals and methods, and information processing apparatuses and methods which allow easy and quick communications.

BACKGROUND ART

As communication technologies have been advanced, various types of units, including not only personal computers but also PDAs (personal digital assistants) and television receivers, have been able to be connected to a network these days.

Various systems have been proposed such as that in which images reproduced by a personal computer are sent to a television receiver through a home network and viewed by using the television receiver.

Although connecting each unit to a network has been gradually made possible with a simple setting, however, it is necessary to set the address of a mating unit and others to execute communication with the unit in each case, and this setting is troublesome.

To display an image reproduced by a personal computer on a television receiver, for example, the user needs to operate the personal computer to specify the address of the television receiver and others.

When many units are connected to a network, it is difficult to check that which unit is connected to which unit. In consideration of the current situation, in which it is expected that structuring networks by radio communication, such as a radio LAN (local area network) and Bluetooth™, has been further spread, there is the possibility that the issue will become further serious in which units connected to each other are not known.

DISCLOSURE OF INVENTION

The present invention has been made in consideration of such a condition, and allows easy and quick communications and also easy recognition of connected units.

An electronic unit according to the present invention is characterized by including identification means identifiable by the sense of sight; storage means for storing identification information; and providing means for providing, when inserted into or placed on a predetermined information processing terminal, the information processing terminal with the identification information stored by the storage means.

An information processing terminal of a communication system according to the present invention is characterized by including reading means for reading, when an electronic unit for associating information processing terminals to be connected, with each other is inserted or placed, first identification information stored in the electronic unit; transmission means for transmitting the first identification information read by the reading means and first positional information indicating the own position on a network to an information processing apparatus for managing a connection to another information processing terminal; and connection means for connecting, when second positional information of the another information processing terminal is reported from the information processing apparatus in response to the transmission of the first identification information and the first positional information performed by the transmission means, to the another information processing terminal according to the second positional information.

The information processing apparatus is characterized by including receiving means for receiving the first identification information and the first positional information when they are transmitted; management means for managing a plurality of pieces of identification information and positional information which include the first identification information and the first positional information received by the receiving means; and reporting means for reporting, when among the identification information managed by the management means the first identification information sent from the information processing terminal and the second identification information sent from the another information processing terminal are the same, the first positional information of the information processing terminal to the another information processing terminal, and for reporting the second positional information of the another information processing terminal to the information processing terminal.

A communication method for a communication system according to the present invention is characterized by including a reading step of reading, when an electronic unit for associating information processing terminals to be connected, with each other is inserted or placed, first identification information stored in the electronic unit; a transmission step of transmitting the first identification information read by the process of the reading step and first positional information indicating the own position on a network to an information processing apparatus for managing a connection with another information processing terminal; a connection step of connecting, when second positional information of the another information processing terminal is reported from the information processing apparatus in response to the transmission of the first identification information and the first positional information performed by the process of the transmission step, to the another information processing terminal according to the second positional information; a receiving step of receiving the first identification information and the first positional information when they are transmitted; a management step of managing a plurality of pieces of identification information and positional information which include the first identification information and the first positional information received by the process of the receiving step; and a reporting step of reporting, when among the identification information managed by the process of the management step the first identification information sent from the information processing terminal and the second identification information sent from the another information processing terminal are the same, the first positional information of the information processing terminal to the another information processing terminal, and for reporting the second positional information of the another information processing terminal to the information processing terminal.

A first information processing terminal according to the present invention is characterized by including reading means for reading, when an electronic unit for associating information processing terminals to be connected, with each other is inserted or placed, identification information stored in the electronic unit; transmission means for transmitting the identification information read by the reading means and first positional information indicating the own position on a network to an information processing apparatus for managing a connection to another information processing terminal; and connection means for connecting, when second positional information of the another information processing terminal is reported from the information processing apparatus in response to the transmission of the identification information and the first positional information performed by the transmission means, to the another information processing terminal according to the second positional information.

The information processing terminal may further include reporting means for reporting, when the reading means cannot read the identification information, to the information processing apparatus that the connection is to be terminated.

An information processing method for the first information processing terminal according to the present invention is characterized by including a reading step of reading, when an electronic unit for associating information processing terminals to be connected, with each other is inserted or placed, identification information stored in the electronic unit; a transmission step of transmitting the identification information read by the process of the reading step and first positional information indicating the own position on a network to an information processing apparatus for managing a connection to another information processing terminal; and a connection step of connecting, when second positional information of the another information processing terminal is reported from the information processing apparatus in response to the transmission of the identification information and the first positional information performed by the process of the transmission step, to the another information processing terminal according to the second positional information.

A program according to the present invention is characterized by making a, computer execute a reading control step of controlling reading, when an electronic unit for associating information processing terminals to be connected, with each other is inserted or placed, of identification information stored in the electronic unit; a transmission control step of controlling the transmission of the identification information read by the process of the reading control step and first positional information indicating the own position on a network to an information processing apparatus for managing a connection to another information processing terminal; and a connection control step of controlling the connection, when second positional information of the another information processing terminal is reported from the information processing apparatus in response to the transmission of the identification information and the first positional information performed by the process of the transmission control step, to the another information processing terminal according to the second positional information.

An information processing apparatus according to the present invention is characterized by including receiving means for receiving identification information of electronic units inserted into or placed on information processing terminals, the identification information being read by the information processing terminals, and positional information of the information processing terminals on a network, when they are transmitted; management means for managing the identification information and the positional information received by the receiving means; and reporting means for reporting, when among the identification information managed by the management means first identification information sent from a first information processing terminal and second identification information sent from a second information processing terminal are the same, the positional information of the first information processing terminal to the second information processing terminal, and for reporting the positional information of the second information processing terminal to the first information processing terminal.

An information processing method for an information processing apparatus according to the present invention is characterized by including a receiving step of receiving identification information of electronic units inserted into or placed on information processing terminals, the identification information being read by the information processing terminals, and positional information of the information processing terminals on a network, when they are transmitted; a management step of managing the identification information and the positional information received by the process of the receiving step; and a reporting step for reporting, when among the identification information managed by the process of the management step first identification information sent from a first information processing terminal and second identification information sent from a second information processing terminal are the same, the positional information of the first information processing terminal to the second information processing terminal, and for reporting the positional information of the second information processing terminal to the first information processing terminal.

A program according to the present invention is characterized by making a computer execute a receiving control step of controlling receiving of identification information of electronic units inserted into or placed on information processing terminals, the identification information being read by the information processing terminals, and positional information of the information processing terminals on a network, when they are transmitted; a management control step of controlling the management of the identification information and the positional information received by the process of the receiving control step; and a reporting control step for controlling reporting, when among the identification information managed by the process of the management control step first identification information sent from a first information processing terminal and second identification information sent from a second information processing terminal are the same, of the positional information of the first information processing terminal to the second information processing terminal, and reporting of the positional information of the second information processing terminal to the first information processing terminal.

A second information processing terminal according to the present invention is characterized by including reading means for reading, when a first electronic unit for associating information processing terminals to be connected, with each other is inserted or placed, identification information stored in the first electronic unit; transmission means for transmitting the identification information read by the reading means and first positional information indicating the own position on a network; receiving means for receiving second positional information indicating the position of another information processing terminal which has read the same identification information as the identification information from a second electronic unit, on the network, sent from the another information processing terminal in response to the transmission of the identification information and the first positional information performed by the transmission means; and connection means for connecting to the another information processing terminal according to the second positional information received by the receiving means.

An information processing method for the second information processing terminal according to the present invention is characterized by including a reading step of reading, when a first electronic unit for associating information processing terminals to be connected, with each other is inserted or placed, identification information stored in the first electronic unit; a transmission step of transmitting the identification information read by the process of the reading step and first positional information indicating the own position on a network; a receiving step of receiving second positional information indicating the position of another information processing terminal which has read the same identification information as the identification information from a second electronic unit, on the network, sent from the another information processing terminal in response to the transmission of the identification information and the first positional information performed by the process of the transmission step; and a connection step of connecting to the another information processing terminal according to the second positional information received by the process of the receiving step.

A program according to the present invention is characterized by making a computer execute a reading control step of controlling reading, when a first electronic unit for associating information processing terminals to be connected, with each other is inserted or placed, of identification information stored in the first electronic unit; a transmission control step of controlling the transmission of the identification information read by the process of the reading control step and first positional information indicating the own position on a network; a receiving control step of controlling receiving of second positional information indicating the position of another information processing terminal which has read the same identification information as the identification information from a second electronic unit, on the network, sent from the another information processing terminal in response to the transmission of the identification information and the first positional information performed by the process of the transmission control step; and a connection control step of controlling the connection to the another information processing terminal according to the second positional information received by the process of the receiving control step.

A third information processing terminal according to the present invention is characterized by including reading means for reading, when an electronic unit for associating information processing terminals to be connected, with each other is inserted or placed, identification information stored in the electronic unit; synchronization establishment means for establishing synchronization with another information processing terminal located in a vicinity; requesting means for requesting the another information processing terminal with which synchronization has been established by the synchronization establishment means to report terminal-name information specified in the another information processing terminal; and connection means for connecting, when the terminal-name information has been reported in response to the request made by the requesting means, to the another information processing terminal which has reported the terminal-name information that includes the same identification information as the identification information read by the reading means.

The information processing terminal may further include generation means for generating the terminal-name information which includes at least the identification information read by the reading means.

An information processing method for the third information processing terminal according to the present invention is characterized by including a reading step of reading, when an electronic unit for associating information processing terminals to be connected, with each other is inserted or placed, identification information stored in the electronic unit; a synchronization establishment step of establishing synchronization with another information processing terminal located in a vicinity; a requesting step of requesting the another information processing terminal with which synchronization has been established by the process of the synchronization establishment step to report terminal-name information specified in the another information processing terminal; and a connection step of connecting, when the terminal-name information has been reported in response to the request made by the process of the requesting step, to the another information processing terminal which has reported the terminal-name information that includes the same identification information as the identification information read by the process of the reading step.

A program according to the present invention is characterized by making a computer execute a reading control step of controlling reading, when an electronic unit for associating information processing terminals to be connected, with each other is inserted or placed, of identification information stored in the electronic unit; a synchronization-establishment control step of controlling the establishment of synchronization with another information processing terminal located in a vicinity; a requesting control step of controlling requesting the another information processing terminal with which synchronization has been established by the process of the synchronization-establishment control step to report terminal-name information specified in the another information processing terminal; and a connection control step of controlling the connection, when the terminal-name information has been reported in response to the request made by the process of the requesting control step, to the another information processing terminal which has reported the terminal-name information that includes the same identification information as the identification information read by the process of the reading control step.

In an electronic unit according to the present invention, it is identifiable by the sense of sight; identification information is stored; when inserted into or placed on a predetermined information processing terminal, the stored identification information is sent to the information processing terminal.

In a communication system and a communication method according to the present invention, when an electronic unit for associating information processing terminals to be connected, with each other is inserted or placed, an information processing terminal reads first identification information stored in the electronic unit; the read first identification information and first positional information indicating the own position on a network are sent to an information processing apparatus for managing a connection to another information processing terminal; and when second positional information of the another information processing terminal is reported from the information processing apparatus in response to the transmission of the first identification information and the first positional information, a connection is made to the another information processing terminal according to the second positional information. Further, the information processing apparatus receives the first identification information and the first positional information when they are transmitted; a plurality of pieces of identification information and positional information which includes the first identification information and the first positional information received are managed; and when among the managed identification information the first identification information sent from the information processing terminal and the second identification information sent from the another information processing terminal are the same, the first positional information of the information processing terminal is reported to the another information processing terminal, and the second positional information of the another information processing terminal is reported to the information processing terminal.

In a first information processing terminal, an information processing method, and a program according to the present invention, when an electronic unit for associating information processing terminals to be connected, with each other is inserted or placed, identification information stored in the electronic unit is read; the read identification information and first positional information indicating the own position on a network are sent to an information processing apparatus for managing a connection to another information processing terminal; and when second positional information of the another information processing terminal is reported from the information processing apparatus in response to the transmission of the identification information and the first positional information performed by the transmission means, a connection is made to the another information processing terminal according to the second positional information.

In an information processing apparatus, an information processing method, and a program according to the present invention, identification information of electronic units inserted into or placed on information processing terminals, the identification information being read by the information processing terminals, and positional information of the information processing terminals on a network are received when they are transmitted; the identification information and the positional information received are managed; and when among the managed identification information first identification information sent from a first information processing terminal and second identification information sent from a second information processing terminal are the same, the positional information of the first information processing terminal is reported to the second information processing terminal, and the positional information of the second information processing terminal is reported to the first information processing terminal.

In a second information processing terminal, an information processing method, and a program according to the present invention, when a first electronic unit for associating information processing terminals to be connected, with each other is inserted or placed, identification information stored in the first electronic unit is read; the read identification information and first positional information indicating the own position on a network are sent; second positional information indicating the position of another information processing terminal which has read the same identification information as the identification information from a second electronic unit, on the network, sent from the another information processing terminal in response to the transmission of the identification information and the first positional information is received; and a connection is made to the another information processing terminal according to the received second positional information.

In a third information processing terminal, an information processing method, and a program according to the present invention, when an electronic unit for associating information processing terminals to be connected, with each other is inserted or placed, identification information stored in the electronic unit is read; synchronization with another information processing terminal located in a vicinity is established; the another information processing terminal with which synchronization has been established is requested to report terminal-name information specified in the another information processing terminal; and when the terminal-name information has been reported in response to the request, a connection is made to the another information processing terminal which has reported the terminal-name information that includes the same identification information as the read identification information.

BRIEF DESCRIPTION OF THE DRAWINGS

FIG. 2 is a perspective view showing example appearances of link pins shown in FIG. 1.

FIG. 6 is a view showing an example list managed by the management server.

BEST MODE FOR CARRYING OUT THE INVENTION

Figure 1:
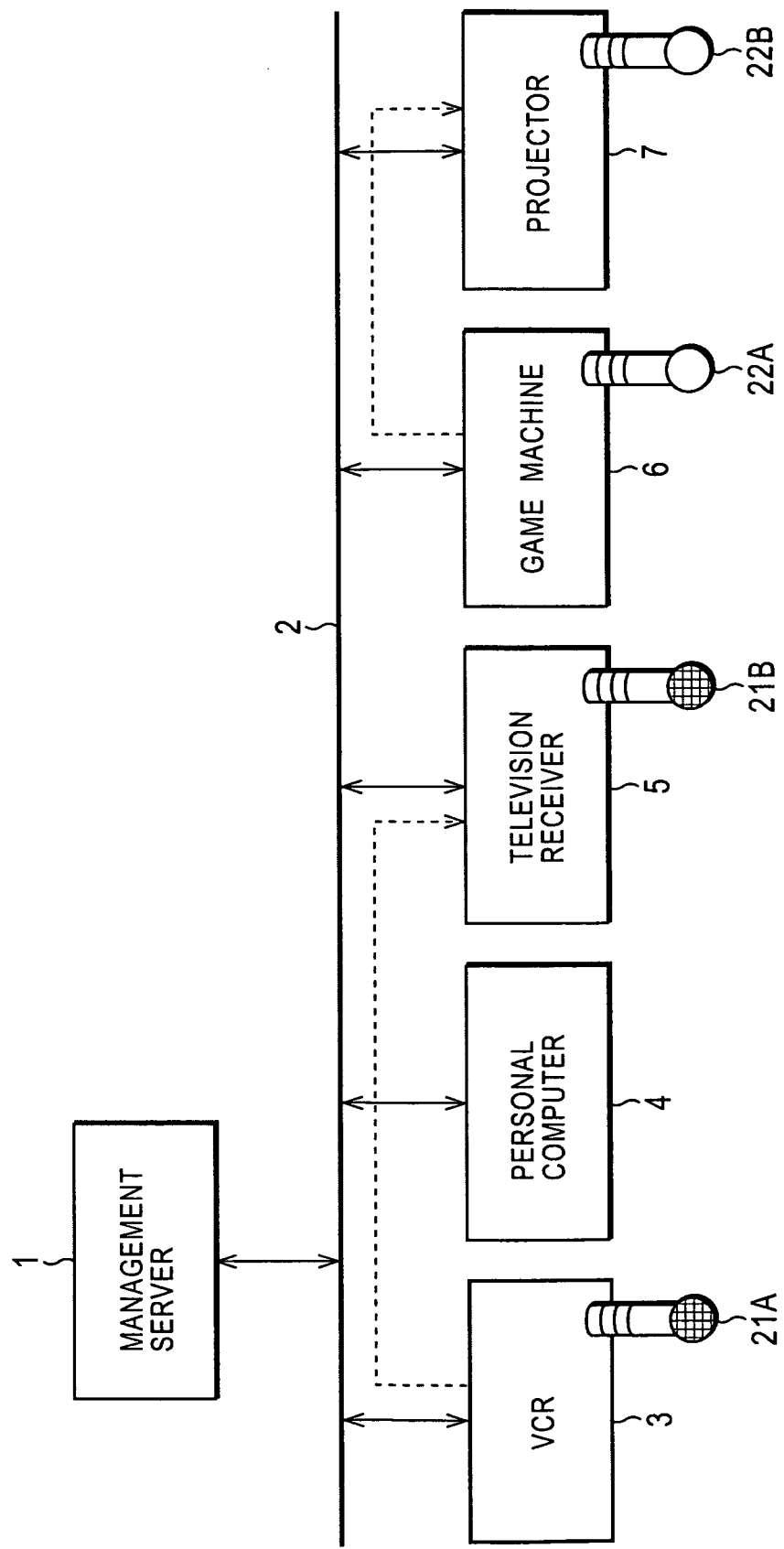
FIG. 1 is a view showing an example structure of a communication system to which the present invention is applied.

FIG. 1 is a view showing the concept of a communication system to which the present invention is applied.

A management server 1 manages the connections of units connected to a network 2. For example, when a link pin 21A and a link pin 21B are inserted to a VCR (video cassette recorder) 3 and a television receiver 5, respectively, the management server 1 connects the VCR 3 and the television receiver 5, as indicated by a one-dot chain line. The network 2 is formed, for example, of an Ethernet or a radio LAN (local area network) such as IEEE (Institute of Electrical and Electronics engineers) 802.11a or 802.11b.

With this, for example, an image reproduced by the VCR 3 is sent to the television receiver 5 through the network 2, and displayed on the television receiver 5.

When a link pin 22A is inserted to a game machine 6, and a link pin 22B is inserted to a projector 7, the management server 1 establishes the connection between the units, as indicated by a one-dot chain line, to display an image reproduced by the game machine 6 on the projector 7.

In this example, the link pin 21A and the line pin 21B form a pair and the link pin 22A and the link pin 22B form a pair. The user can check the head (circular part in the figure) of each pin to identify the pair. Details of the link pin 21A and the link pin 21B will be described later.

A personal computer 4 is also connected to a network 2. The user can change units to be connected to each other without setting addresses and other, just by inserting the link pin 21A and the link pin 21B, and the link pin 22A and the link pin 22B to the units. (Hereinafter, when it is not necessary to distinguish the units connected to the network 2, from the VCR 3 to the projector 7, they are called clients accordingly.)

FIG. 2 is a view showing example appearances of the link pin 21A and link pin 21B.

As shown in the figure, the link pin 21A is formed basically of an identification part 31A and a shaft 32A, and an RF tag 33A is provided at a predetermined position of the shaft 32A. In the same way, the link pin 21B is also formed of an identification part 31B and a shaft 32B, and an RF tag 33B is provided at a predetermined position of the shaft 32B.

The identification part 31A of the link pin 21A and the identification part 31B of the link pin 21B have a sphere shape, for example, and are colored by the same color. Therefore, the user can recognize at a glance that the link pin 21A and the link pin 21B form a pair, that is, units to which the link pin 21A and the link pin 21B are inserted are connected through the network 2.

Although not shown in a figure, the identification parts of the above-described link pin 22A and the link pin 22B are colored by a different color from that of the identification parts 31A of the link pin 21A and the identification part 31B of the link pin 21B.

When the shaft 32A and the shaft 32B are inserted into the insertion sections provided at predetermined positions of clients (the VCR 3 to the projector 7), the RF tag 33A which is built in the shaft 32A, and the RF tag 33B which is built in the shaft 32B, provide stored identification information for the clients. More specifically, the insertion sections of the clients are provided with readers for reading the identification information stored in the RF tag 33A and the RF tag 33B.

The identification information (hereinafter called a pin ID, if necessary) stored in the RF tag 33A or the RF tag 33B is formed, for example, of a group ID and an individual ID. The group ID is set such that the RF tag 33A and the RF tag 33B has the same group ID, and the individual ID is set such that each RF tag has a different individual ID.

For example, a pin ID of "pin00001-01" formed of a group ID of "pin00001" and an individual ID of "01" is assigned to the RF tag 33A, and a pin ID of "pin00001-02" formed of a group ID of "pin00001" and an individual ID of "02" is assigned to the RF tag 33B.

Therefore, when the management server 1 receives pin IDs read by clients, the management server 1 can check the group ID included in the pin IDs to connect the clients to which the link pin 21A and the link pin 21B have been inserted.

Figure 3A:
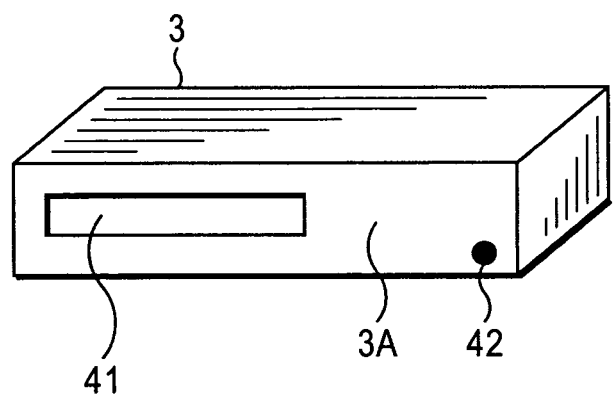
FIG. 3A is a perspective view showing an example appearance of a VCR shown in FIG. 1.
Figure 3B:
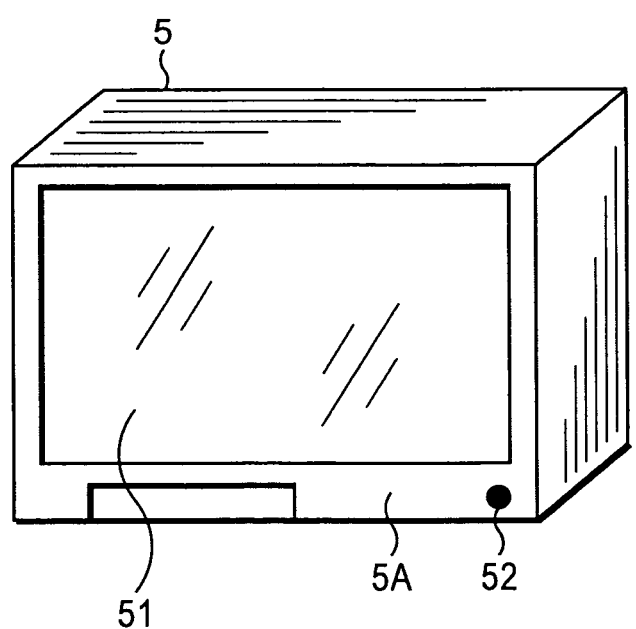
FIG. 3B is a perspective view showing an example appearance of a television receiver shown in FIG. 1.

FIG. 3A is a perspective view showing an example appearance of the VCR 3, and FIG. 3B is a perspective view of an example appearance of the television receiver 5.

As shown in FIG. 3A, a link-pin insertion section 42 is provided at the lower right of a front face 3A at which a cassette insertion section 41 is provided, and the shaft 32A of the link pin 21A, for example, can be inserted into and pulled out of the link-pin insertion section 42. In a vicinity of the link-pin insertion section 42, a reader for reading the pin ID stored in the RF tag 33A of the inserted link pin 21A is provided.

As shown in FIG. 3B, a link-pin insertion section 52 is provided, in the same way as in the VCR 3, at the lower right of a face 5A of the television receiver 5, at which a display section 51 is provided, and the shaft 32B of the link pin 21B, for example, can be inserted into and pulled out of the link-pin insertion section 52. Also in a vicinity of the link-pin insertion section 52, a reader for reading the pin ID stored in the RF tag 33B of the inserted link pin 21B is provided.

To change the connection destination of a client, the user pulls out the link pin inserted into the link-pin insertion section provided at a predetermined position in this way, and inserts the link pin into the link-pin insertion section of a client to which a new connection is made.

Figure 4:
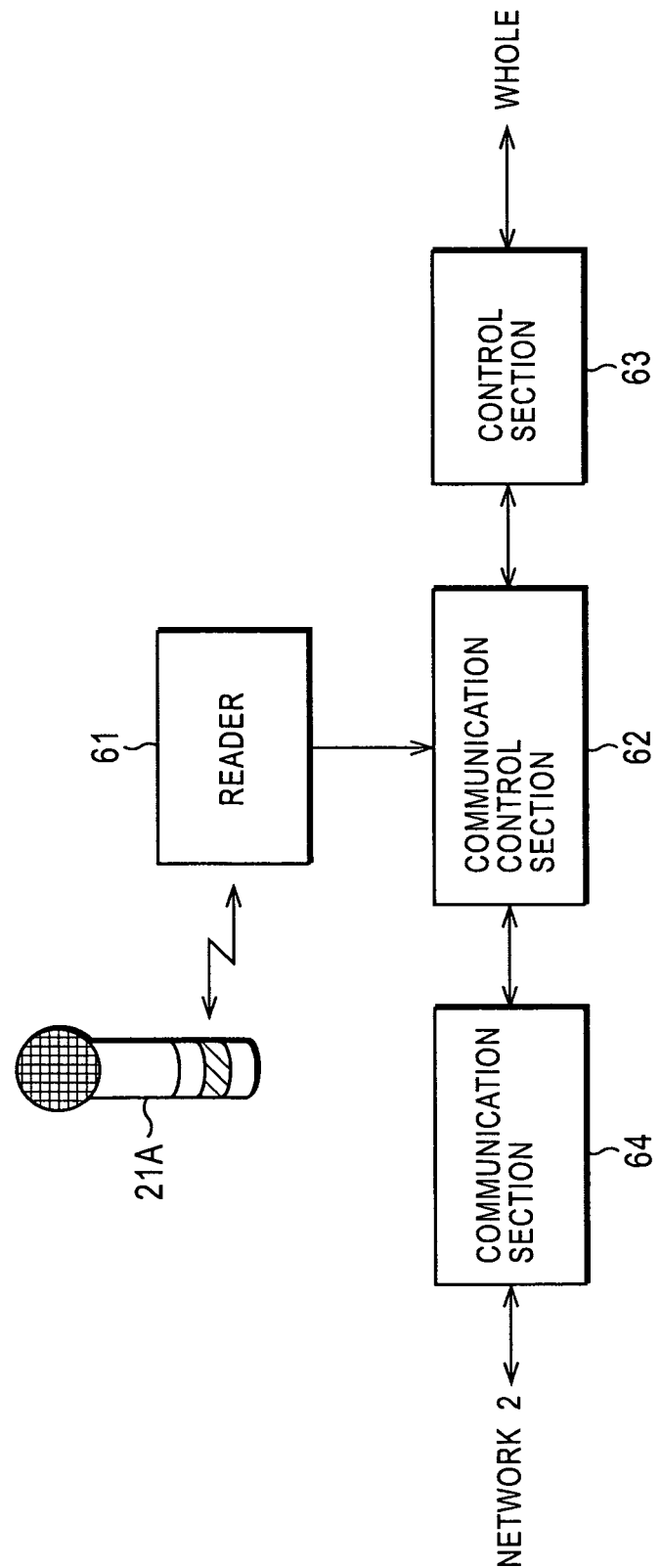
FIG. 4 is a block diagram showing an example structure provided for each client shown in FIG. 1.

FIG. 4 is a view showing an example structure of a client. Such a structure is provided for each client shown in FIG. 1.

When the link pin 21A, for example, is inserted into the link-pin insertion section provided in a vicinity of a reader 61, the reader 61 reads the pin ID stored in the RF tag 33A, and outputs it to a communication control section 62. When the inserted link pin 21A is pulled out, the reader 61 reports the state to the communication control section 62.

The communication control section 62 sends, for example, the pin ID sent from the reader 61 to the management server 1 through a communication section 64 and the network 2, according to an instruction sent from a control section 63 which controls the operation of the whole of the client. The communication control section 62 also sends data sent from the control section 63 to another client through the communication section 64 and others, and if necessary, outputs data sent from another client to the control section 63.

When the structure shown in FIG. 4 is provided for the VCR 3, and the VCR 3 and the television receiver 5 are connected (link pins having the same group ID have been inserted thereinto), for example, the communication control section 62 sends video data and audio data sent from the control section 63 to the television receiver 5.

When the structure shown in FIG. 4 is provided for the projector 7, and the projector 7 and the game machine 6 are connected, the communication control section 62 sends video data and audio data of a game, sent from the communication section 64 to the control section 63.

The control section 63 controls the operation of the whole of the client. When the structure shown in FIG. 4 is provided for the VCR 3, for example, the control section 63 controls the operation of a head not shown, and others, reads video data and audio data recorded in a mounted cassette, and outputs them to the communication control section 62.

When the structure shown in FIG. 4 is provided for the projector 7, the control section 63 outputs video data sent from the communication control section 62 to a reproduction section not shown to display the image, and also outputs received audio data to the reproduction section not shown to outputs the sound from a speaker.

The communication section 64 is connected to the network 2, and sends data sent from the communication control section 62, to another client and to the management server 1. The communication section 64 also receives data sent from another client and others, and outputs it to the communication control section 62.

Figure 5:
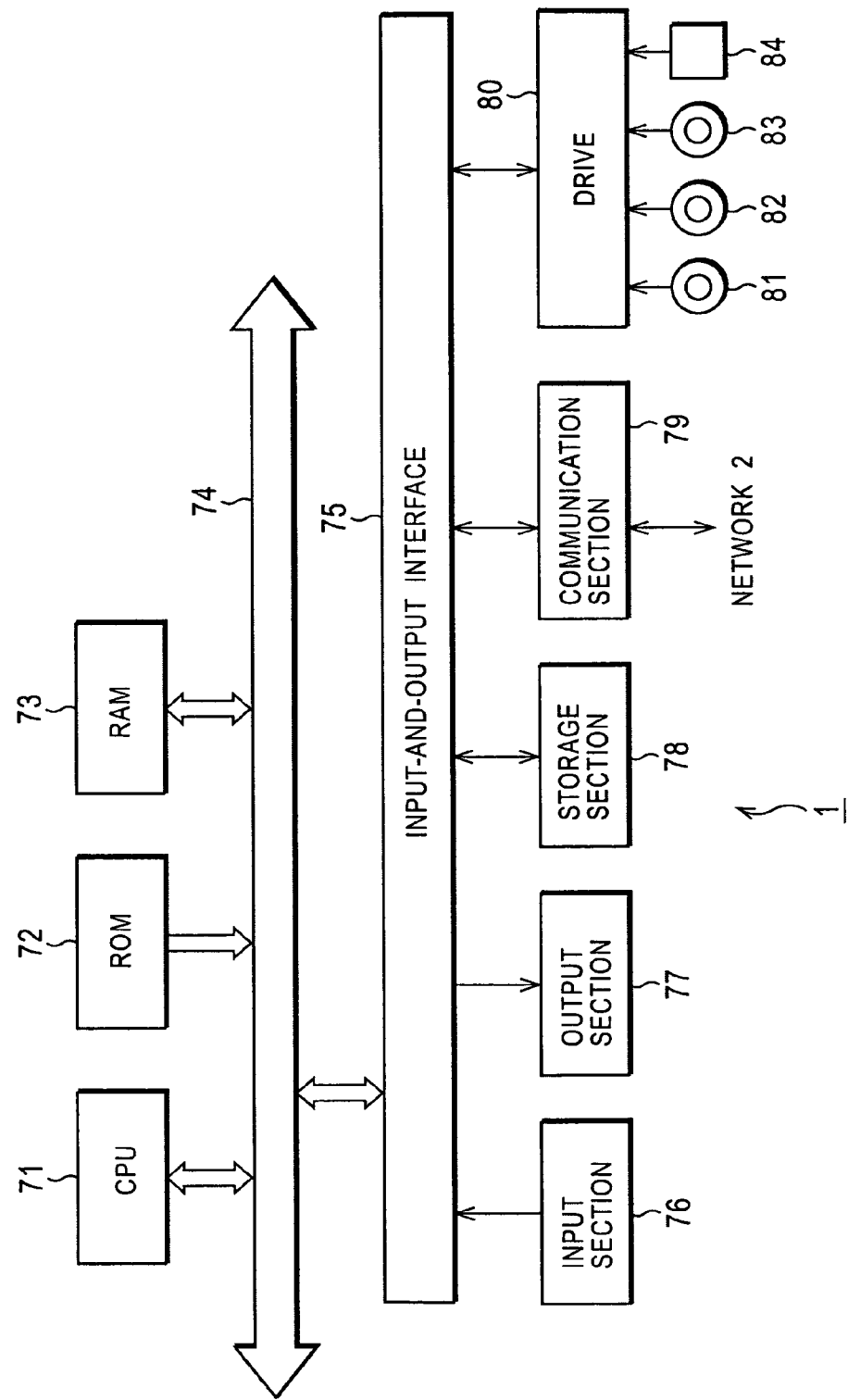
FIG. 5 is a block diagram showing an example structure of a management server shown in FIG. 1.

FIG. 5 is a block diagram showing an example structure of the management server 1.

A CPU (central processing unit) 71 executes various types of processing according to a program stored in a ROM (read only memory) 72 or a program loaded from a storage section 78 to a RAM 73 (random access memory). The RAM 73 also stores, if necessary, data required by the CPU 71 to execute the various types of processing.

The CPU 71, the ROM 72, and the RAM 73 are connected to each other through a bus 74. An input-and-output interface 75 is also connected to the bus 74.

An input section 76 formed of a keyboard, a mouse, and others, an output section 77 formed of a display, such as a CRT (cathode ray tube) or an LCD (liquid-crystal display), a speaker, and others, the storage section 78 formed of a hard disk and others, and a communication section 79 are connected to the input-and-output interface 75.

The storage section 78 stores various types of application software used by the CPU 71, and sends application software to the CPU 71, if necessary. The storage section 78 also generates a list for managing clients connected through the network 2, according to an instruction sent from the CPU 71, and stores the list.

FIG. 6 is a view showing an example list stored in the storage section 78.

The list shown in the figure stores clients to which link pins are inserted to which a group ID of "pin00001" has been assigned.

As described above, When the link pin 21A has a pin ID of "pin00001-01", the link pin 21B has a pin ID of "pin00001-02", the link pin 21A is inserted into the VCR 3, and the link pin 21B is inserted into the television receiver 5, the VCR 3 and the television receiver (TV) 5 are registered on the list as shown in FIG. 6. Both of the link pin 21A and the link pin 21B have a group ID of "pin 00001".

In the example shown in FIG. 6, the address (address on the network 2) of the VCR 3 registered as a client 1 is set to "255:255:255:254" and the address of the television receiver 5 registered as a client 2 is set to "255:255:255:255". These addresses are managed by the corresponding clients, and sent from the clients together with the pin IDs when the link pins are inserted.

These addresses may be registered on the management server 1 in advance. In this case, a client to which a link pin is inserted sends the pin ID and information (information which includes the address) identifying the client.

The storage section 78 manages such a list according to an instruction sent from the CPU 71, and, when the VCR 3 reports that the inserted link pin 21A was pulled out, for example, deletes the entry of the VCR 3 from the list.

Back to the description made by referring to FIG. 5, the communication 79 performs communications through the network 2. When the VCR 3 reports that the link pin 21A has been inserted, for example, the communication section 79 outputs the report to the storage section 78 and others.

A drive 80 is also connected to the input-and-output interface 75, if necessary. A magnetic disk 81, an optical disk 82, a magneto-optical disk 83, or a semiconductor memory 84 is mounted to the drive 80, if necessary, and a computer program read therefrom is installed in the storage section 78, as required.

The operation of the communication system shown in FIG. 1 will be described next.

Figure 7:
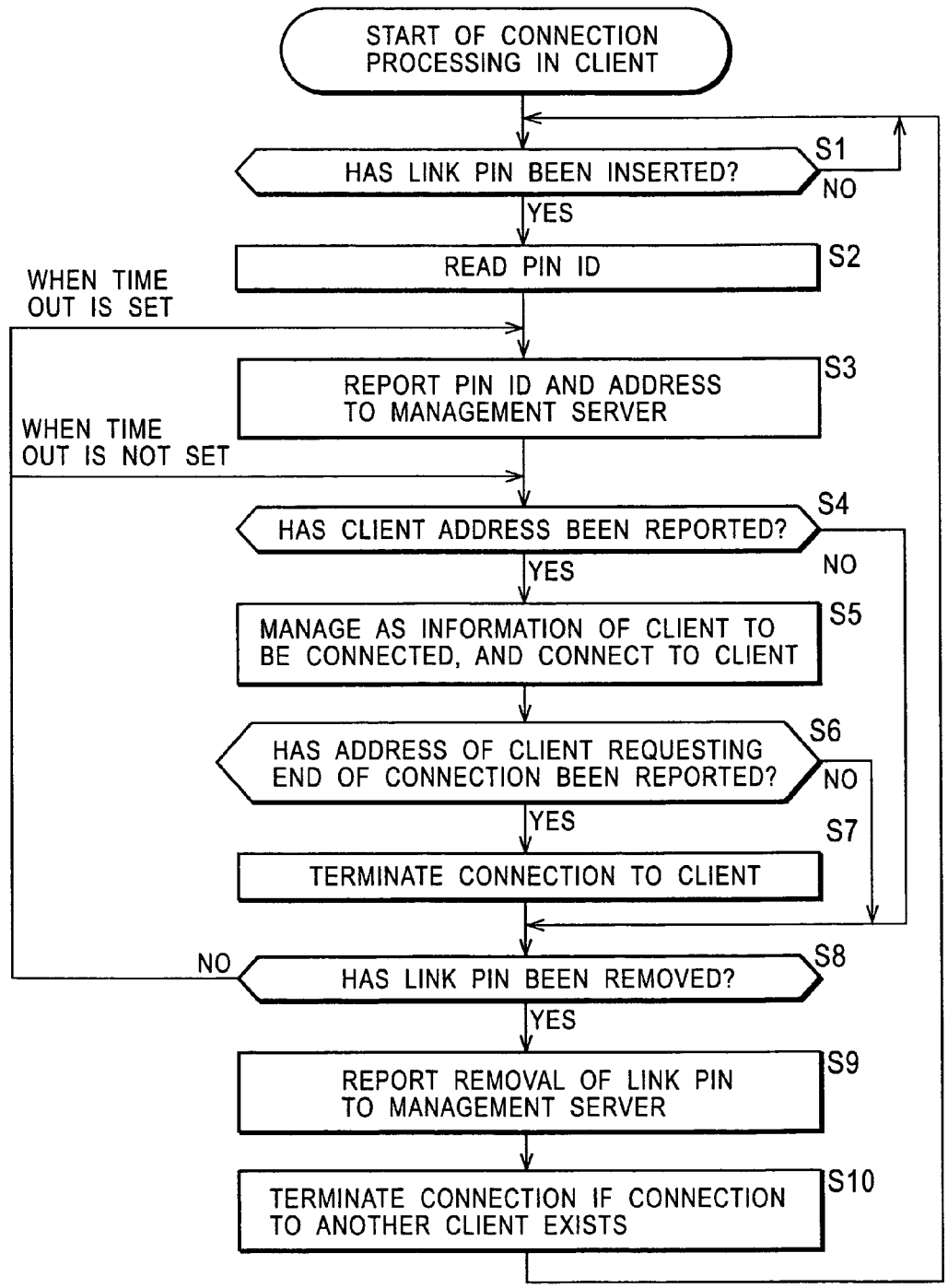
FIG. 7 is a flowchart describing processing of a client shown in FIG. 1.

Processing of a predetermined client, for example, the VCR 3, for connecting to another client will be described first by referring to a flowchart shown in FIG. 7.

In step S1, the reader 61 of the VCR 3 determines whether a link pin has been inserted into the link-pin insertion section 42 (whether a pin ID has been read), and waits for until it determines that a link pin has been inserted.

When the user inserts the link pin 21A into the link-pin inserting section 42, for example, the processing proceeds to step S2, and the reader 61 reads the pin ID stored in the RF tag 33A. The pin ID read by the reader 61 is sent to the communication control section 62. The pin ID may be encrypted by a predetermined method and provided by the RF tag 33.

In step S3, the communication control section 62 sends the pin ID and the address assigned to the VCR 3 to the management server 1. In step S4, the communication control section 62 determines whether the address of another client (any of the personal computer 4 to the projector 7) has been received. When a client sends the pin ID and others, the management server 1 sends the address registered on the list corresponding to the group ID included in the pin ID, to the client which has sent the pin ID and others, as will be described later by referring to a flowchart shown in FIG. 8.

When the communication control section 62 determines in step S4 that the address of another client has not been received, the processing skips the following steps S5 to S7, and proceeds to step S8.

When the communication control section 62 determines in step S4 that the address of another client has been received, the processing proceeds to step S5, and the received address is managed as the address of a client to be connected through the network 2, and a connection to the client is made.

When the address of the television receiver 5 has been entered into a list such as that shown in FIG. 6, for example, since the address is sent from the management server 1, the communication control section 62 makes a connection to the television receiver 5 according to the received address.

In step S6, the communication control section 62 determines whether the address of a client which requests the end of connection has been sent from the management server 1. When it is determined that the address has been sent, the processing proceeds to step S7, and the connection to the client is terminated.

When the link pin 21B is removed from the television receiver 5, and this removal is reported to the management server 1, for example, the information of the television receiver 5 is deleted from the list and the end of connection is reported to the VCR 3. With this, the connection between the VCR 3 and the television receiver 5 is terminated.

When the communication control section 62 determines in step S6 that the address of a client with which a connection is terminated has been sent from the management server 1, the process of step S7 is skipped and the processing proceeds to step S8.

In step S8, the reader 61 determines whether the link pin 21A has been removed from the link-pin insertion section 42. When the reader 61 determines that the link pin has not been removed, and a so-called time out, in which a connection is terminated after a predetermined time elapses, has been set, the processing returns to step S3, and the subsequent processes are repeatedly executed. With this, information such as a pin ID read by the reader 61 is sent to the management server 1 at a predetermined interval. When a time out is set, if a cause such as a physical disconnection of the network occurs, other than "the removal of the link pin 21A", the connection is terminated because of the time out. When a time out is not set, the processes of step S4 and subsequent steps are executed.

When the user makes a change the output of the television receiver 5 to one which is reproduced by the personal computer 4, the user removes the link pin 21A inserted into the VCR 3, and inserts it into the insertion section of the personal computer 4.

When the reader 61 determines in step S8 that the link pin 21A has been removed, the reader 61 reports the removal to the communication control section 62. When the reader 61 reports the removal of the link pin 21A, the communication control section 62 reports to the management server 1 in step S9 that the link pin 21A has been removed.

When a connection to another client exists, the communication control section 62 terminates the connection to the client in step S10. The above-described processing is repeatedly executed thereafter.

Such processing is also executed in clients other than the VCR 3 to connect to each other clients to which link pins having the same group IDs are inserted.

Figure 8:
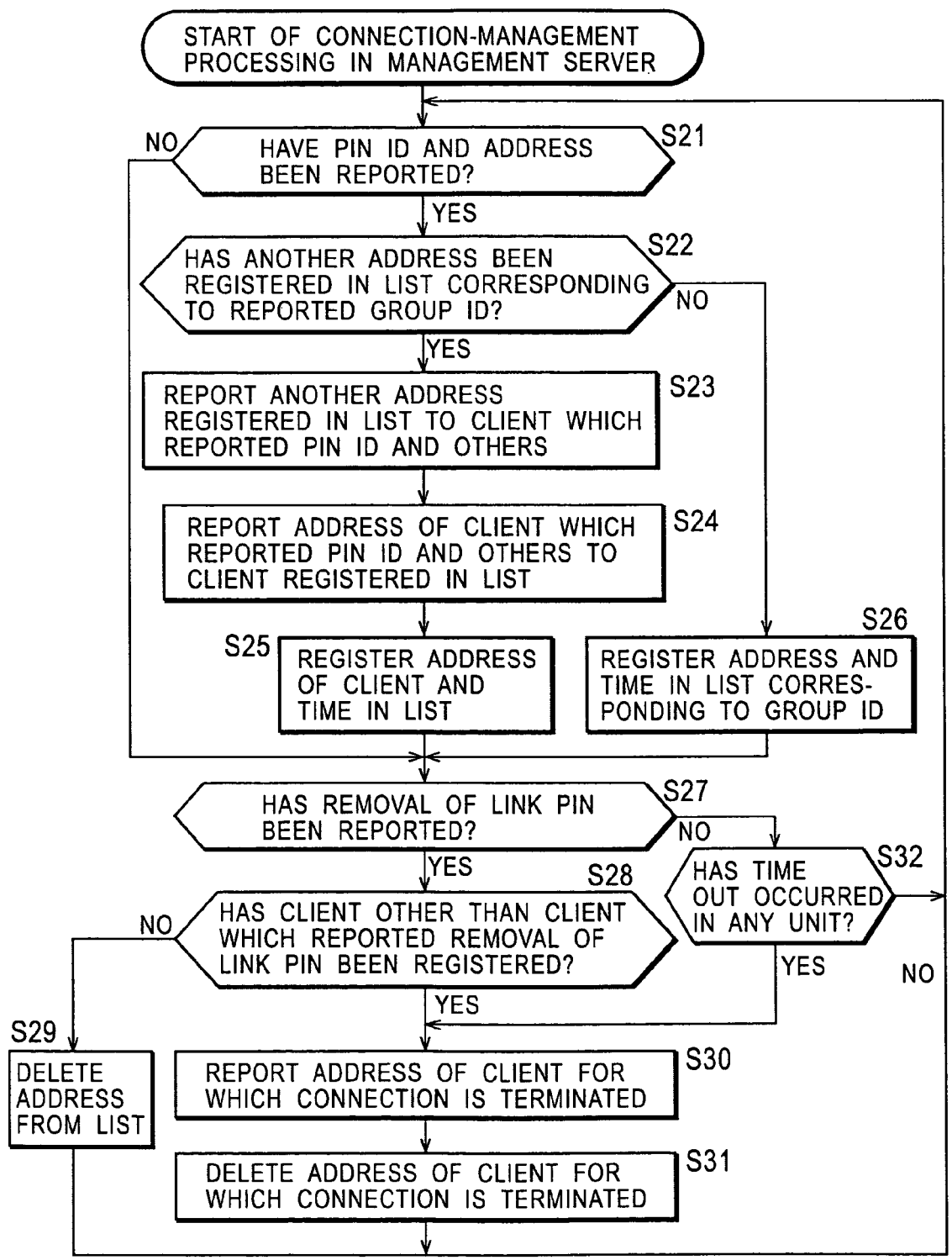
FIG. 8 is a flowchart describing processing of the management server shown in FIG. 1.

Processing of the management server 1, executed correspondingly to the processing shown in FIG. 7 will be described next by referring to the flowchart shown in FIG. 8.

In step S21, the CPU 71 of the management server 1 checks information received by the communication section 79 to determine whether any client has reported the pin ID and the address. When the CPU 71 determines in step S21 that the pin ID and the address have not been reported, the processing skips the processes of step S22 to step S26, described later. When the CPU 71 determines in step S21 that the pin ID and the address have been reported, the processing proceeds to step S22.

In step S22, the CPU 71 determines whether the address of another client has already been registered on the list (list of clients to which link pins having the same group ID are inserted) corresponding to the group ID included in the reported pin ID.

For example, as shown in FIG. 6, when the television receiver has already been registered on the list corresponding to a group ID of "pin00001", if a pin ID of "pin00001-01" and an address of "255:255:255:254" are reported by the VCR 3 in that state, the CPU 71 determines in step S22 that the address of another client (television receiver 5) has been registered on the list corresponding to the group ID included in the reported ID, and the processing proceeds to step S23. The list also stores, if necessary, the time when the pin ID and others were reported, and others.

In step S23, the CPU 71 reports the addresses of all clients entered in the list, that is, the address of the television receiver 5, to the VCR 3. If link pins to which a group ID of "pin00001" has been assigned are inserted into clients other than the television receiver 5, the addresses of those clients are also reported.

In step S24, the CPU 71 reports the address of the VCR 3 to the television receiver 5 already registered on the list. The processing proceeds to step S25, and the CPU 71 registers the address of the VCR 3 and the current time on the list, if necessary, and stores it, which is similar to that shown in FIG. 6, in the storage section 78.

With this, the VCR 3 and the television receiver 5 obtains the addresses of the mating units, and communication is established. The management server 1 may control the switching of the selector connected to each client to physically connect the clients registered on the list to each other.

When the CPU 71 determines in step S22 that the address of another client has not been registered on the list corresponding to the group ID, the processing proceeds to step S26, and the CPU 71 registers the address of the client which reported the pin ID and the time on the list corresponding to the group ID. In other words, when the reported address is sent from a client already registered (one client has been registered on the list), the entry time is updated.

In step S27, the CPU 71 determines whether a client has reported the removal of the link pin. When it is determined that a client has reported the removal of the link pin, the processing proceeds to step S28, and the CPU 71 determines whether, in the list in which the address of the client has been registered, the address of another client has been registered.

When the CPU 71 determines in step S28 that the address of another client has not been registered, the processing proceeds to step S29, and the CPU 71 deletes the address of the client from which the link pin has been removed, from the list. Then, the processing returns to step S21, and the subsequent processes are repeatedly executed.

When the CPU 71 determines in step S28 that, in the list in which the address of the client which reported the removal of the link pin has been registered, the address of another client has been registered, the processing proceeds to step S30, and the CPU 71 reports the address of the client (client which reported the removal of the link pin) for which a connection is terminated, to the registered another client.

With this, the connection between the clients into which the link pins having the same group ID were inserted is released.

The processing proceeds to step S31, and the CPU 71 deletes the address of the client which reported the removal of the link pin, from the list.

When the CPU 71 determines in step S27 that a client has not reported the removal of the link pin, the processing proceeds to step S32, and the CPU 71 determines next whether time out occurs in a unit. As described above, the management server 1 also manages the time when the pin ID and others were reported, and the connection to a predetermined unit is terminated (time-out occurs in the unit), if necessary, according to the time.

When the CPU 71 determines in step S32 that time out has not occurred in any unit, the processing returns to step S21, and the processes of the subsequent steps are repeatedly executed. When the CPU 71 determines in step S32 that time out has occurred in a unit, the processing proceeds to step S30, and the above-described processes are executed. More specifically, the address of the client for which the connection is terminated is reported to the other clients, and then, is deleted from the list.

For example, as described above, when the VCR 3 and the television receiver 5 are connected, and the VCR 3 has reported the removal of the link pin 21A, the CPU 21 reports the address of the VCR 3 to the television receiver 5, and deletes the address of the VCR 3 from the list. Then, the processing proceeds to step S21, and the above processes are repeatedly executed.

With this, the user can perform communications easily and quickly just by inserting link pins to desired clients. In addition, the user can easily understand connected clients just by checking the identification sections of the inserted link pins.

For example, when the user inserts the link pin 21A into the personal computer 4, and the link pin 21B into a printer not shown, the personal computer 4 recognizes according to the address of the printer, reported from the management server 1 that the connected client is the printer, and sends data to be printed out to the printer, due to the above-described processing.

Then, the address reported from the management server 1 may be entered into the personal computer 4 as the address of the default printer.

Figure 9:
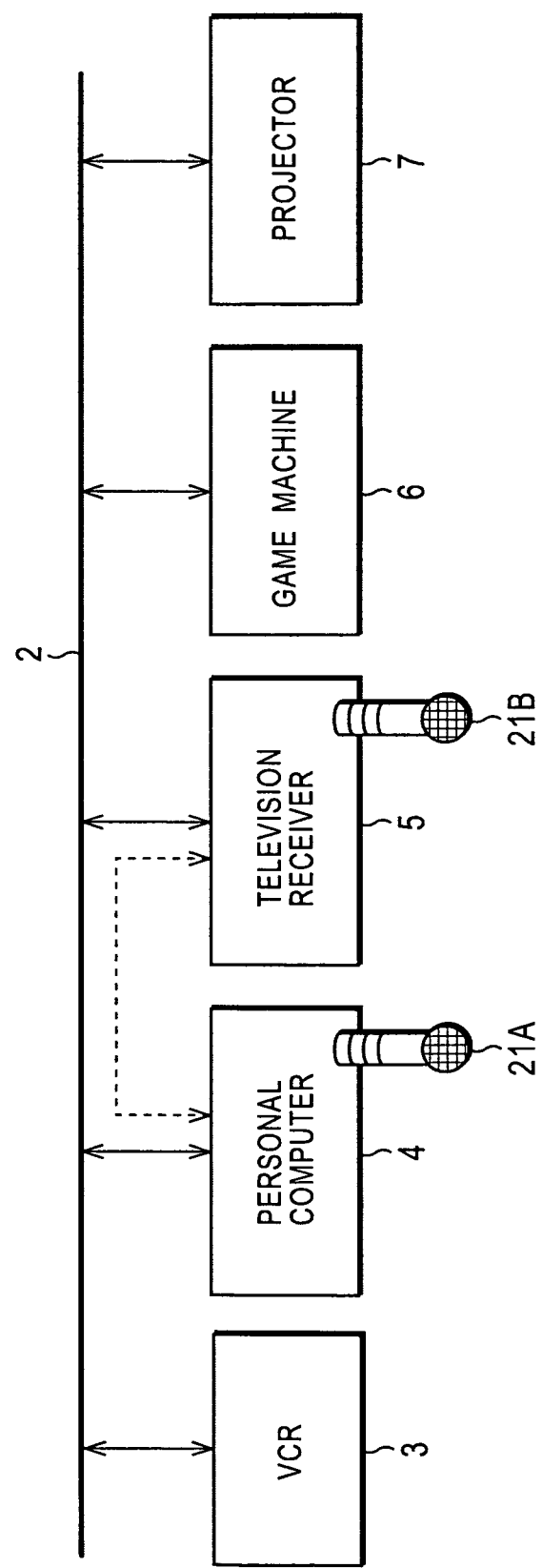
FIG. 9 is a view showing another example structure of the communication system to which the present invention is applied.

A case in which the management server 1 is connected to the network 2 has been described so far. As shown in FIG. 9, even if the management server 1 does not exist, the user can connect desired clients just by inserting link pins to the clients.

In a case in which the management server 1 does not exist, as shown in FIG. 9, when the link pin 21A is inserted into the personal computer 4, for example, the personal computer 4 reads the pin ID, broadcasts the read pin ID and the address to all units (clients), and detects a unit into which a link pin having the same group ID.

For example, when the link pin 21B, to which the same group ID is assigned as to the link pin 21A, is inserted into the television receiver 5, the television receiver 5 responds to the detection from the personal computer, and reports its address to the personal computer 4.

Communications are established between units which have exchanged the addresses with each other.

Processing of each unit constituting the communication system shown in FIG. 9 will be described next by referring to a flowchart shown in FIG. 10. In this example, processing of the personal computer 4 will be described.

In step S41, the reader 61 of the personal computer 4 determines whether a link pin has been inserted into the link-pin insertion section of the personal computer 4, and waits for until it determines that a link pin has been inserted. When the reader 61 determines, for example, that the link pin 21A is inserted, the processing proceeds to step S42, and the reader 61 reads a pin ID formed of a group ID and an individual ID, such as those described above.

When the reader 61 sends the pin ID to the communication control section 62, the communication control section 62 broadcasts its own address and the pin ID of the link pin 21A, and detects a unit to which a link pin having the same group ID is inserted.

In step S44, the communication control section determines whether a unit to which a link pin having the same group ID is inserted has been detected. When it is determined that such a unit has not been detected, the processing proceeds to step S45, and it is determined whether the link pin 21A has been removed.

When the communication control section 62 determines in step S45 that the link pin 21A has been removed, the processing proceeds to step S41, and the above-described processes are repeatedly executed. Contrarily, when it is determined the link pin 21A has not been removed, the processing returns to step S43, and the subsequent processes are repeatedly performed.

When the communication control section determines in step S44 that a unit to which a link pin having the same group ID is inserted has been detected, the processing proceeds to step S46, and the communication control section 62 receives the address sent from the unit.

In step S47, the communication control section 62 makes a connection to the detected unit, to which a link pin having the same group ID is inserted, according to the received address. When link pins having the same group ID are inserted into a plurality of units and those units are detected, all the detected units may be shown to the user and selected.

For example, when the television receiver 5 to which the link pin 21B having the same group ID as the link pin 21A is inserted receives the address of the personal computer 4 and others sent for unit detection, the television receiver 5 responds thereto, and reports its own address to the personal computer 4.

In step S48, the communication control section 62 determines whether a connected unit, such as the television receiver 5, has requested the release of the connection (whether the link pin 21B has been removed from the television receiver 5). When it is determined that the release of the connection has been requested, the processing proceeds to step S49.

In step S49, the communication control section 49 releases the connection to the television receiver 5. The processing returns to step S43, and the subsequent processes are repeatedly executed.

Contrarily, when the communication control section 62 determines that the release of the connection has not been requested, the processing proceeds to step S50, and the communication control section 62 determines whether the link pin 21A has been removed from the link-pin insertion section.

When the communication control section 62 determines in step S50 that the link pin 21A has not been removed, the processing returns to step S47, and the connection to the television receiver 5 continues. When the communication control section 62 determines that the link pin 21A has been removed, the processing proceeds to step S51.

In step S51, the communication control section 62 requests the television receiver 5 to release the connection. The processing proceeds to step S52, and the connection is terminated. Then, the processing returns to step S41, and the above processes are executed.

Figure 11:
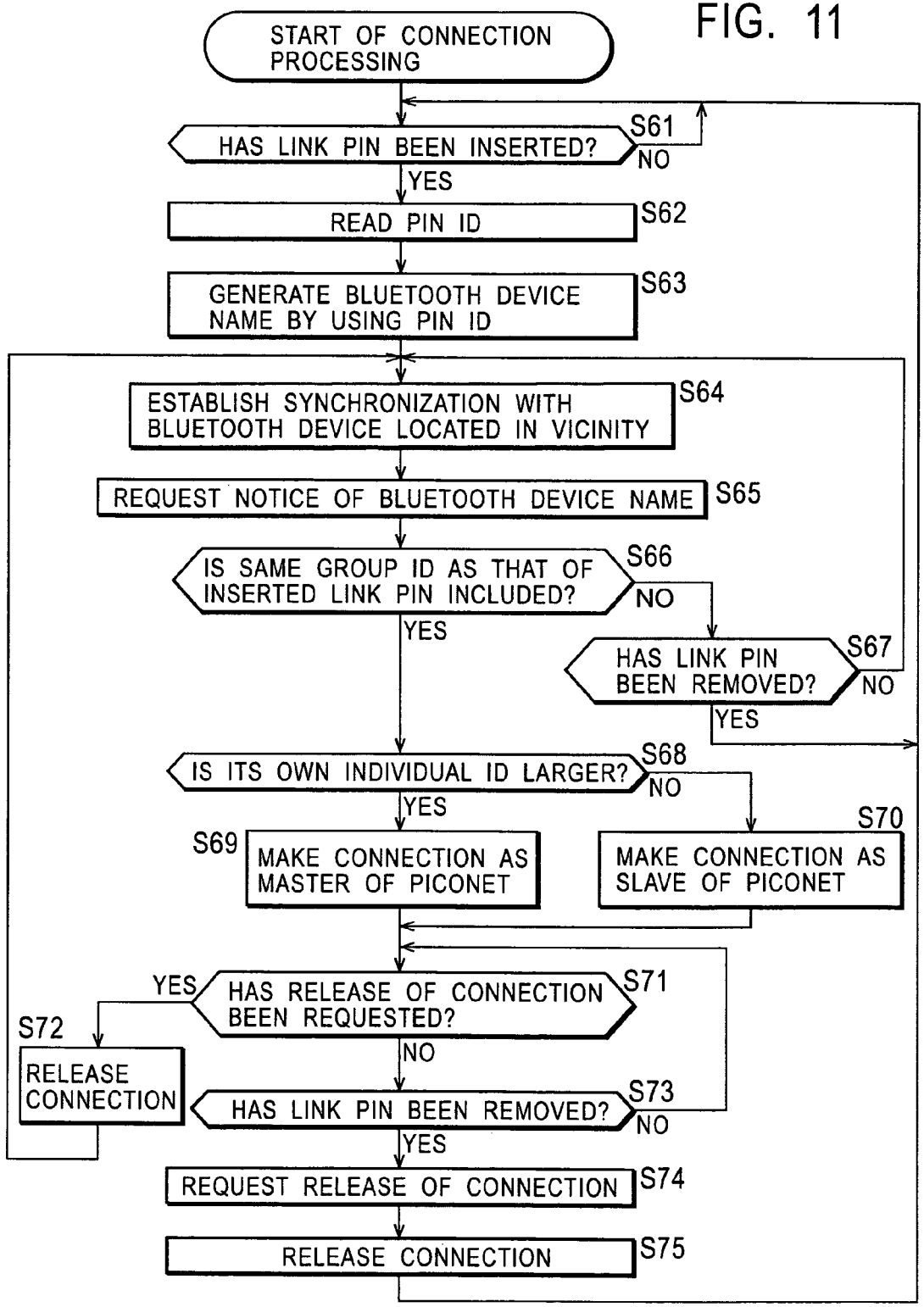
FIG. 11 is a flowchart describing another processing of a unit shown in FIG. 9.

Processing of each unit in a case in which the network 2 shown in FIG. 9 uses Bluetooth will be described next by referring to FIG. 11. Also in FIG. 11, processing of the personal computer 4 will be described.

Figure 10:
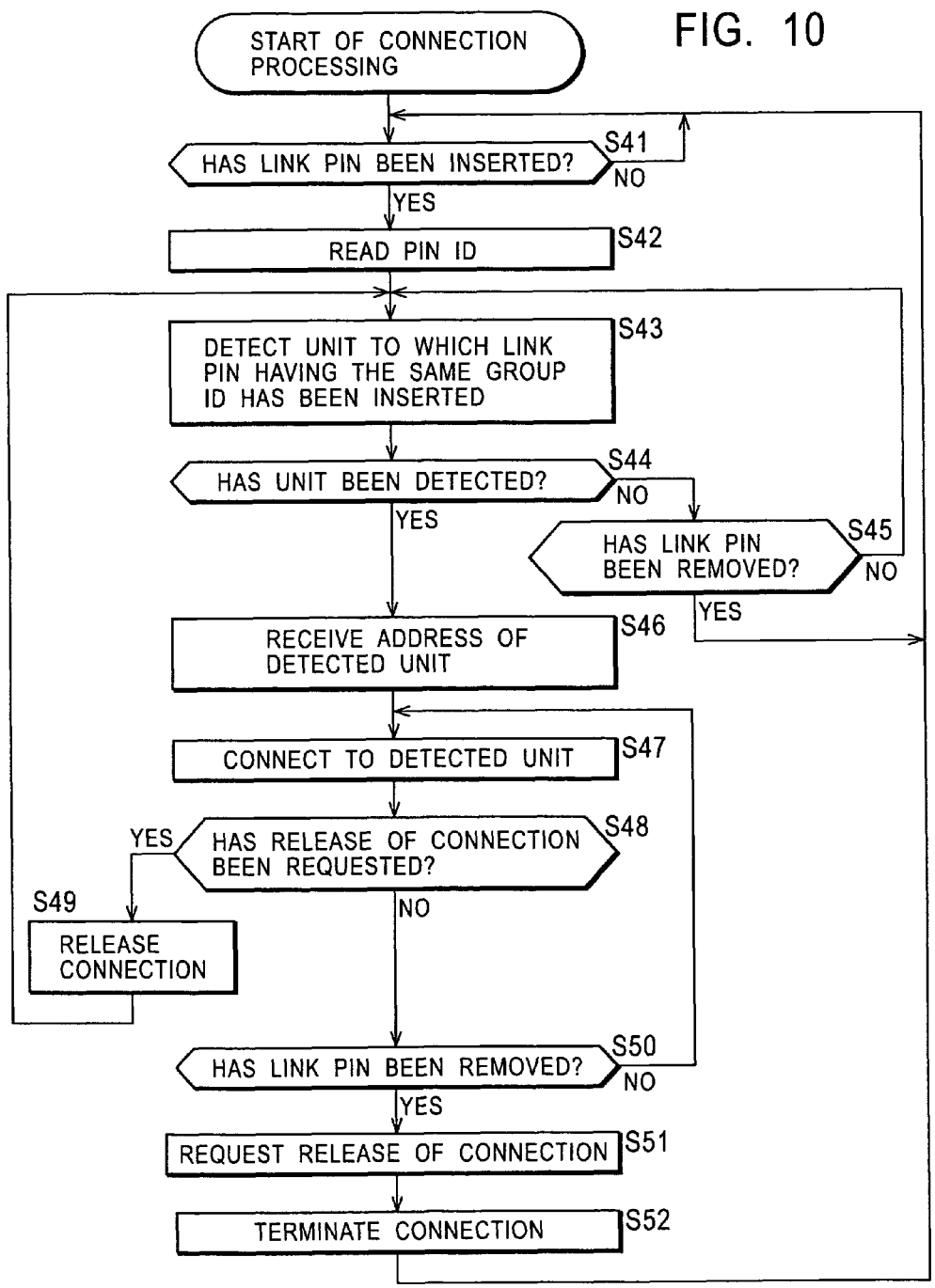
FIG. 10 is a flowchart describing processing of a unit shown in FIG. 9.

The processes of step S61 and step S62 are the same as those of step S41 and step S42 shown in FIG. 10. More specifically, the reader 61 of the personal computer 4 determines in step S61 whether a link pin has been inserted. When the reader 61 determines that the link pin 21A has been inserted, the processing proceeds to step S62, and the reader 61 reads the pin ID thereof.

In step S63, the communication control section 62 generates a Bluetooth device name by using the pin ID. The Bluetooth device name indicates the unit name of a device (Bluetooth device) provided with a Bluetooth module, and can be changed as desired by each Bluetooth device.

More specifically, the communication control section 62 generates a Bluetooth device name according to the pin ID and information, such as a Bluetooth address, specified in advance unique to each Bluetooth device. For example, when the reader 61 reads a pin ID of "pin00001-01" and the personal computer 4 has a Bluetooth address of "pc1", the communication control section 62 combines them to generate a Bluetooth device name of "pc1-pin00001-01" formed of the Bluetooth address, the group ID, and the individual ID.

Also in each unit to which a link pin has been inserted, a Bluetooth device name is generated in the same way.

The processing proceeds to step S64, and the communication control section 62 establishes synchronization with a Bluetooth device disposed in its vicinity. More specifically, in step S64, the communication control section 62 performs "inquiry" and "page" specified in Bluetooth to establish synchronization with a Bluetooth device located in the vicinity in a frequency axis (frequency hopping pattern) and a time axis (time slot).

In step S65, the communication control section 62 requests the Bluetooth device with which synchronization has been established, to send the Bluetooth device name.

In step S66, the communication control section 62 determines whether the reported Bluetooth device name includes the same group ID as that of the link pin 21A inserted into the personal computer 4.

For example, as shown in FIG. 9, when the link pin 21B having a pin ID of "pin00001-02" is inserted into the television receiver 5, the television receiver 5 also generates a Bluetooth device name as described above, and sends a Bluetooth device name of, for example, "tv1-pin00001-02".

When the communication control section 62 determines in step S66 that the reported Bluetooth device name does not include the same group ID as that of the link pin 21A, the processing proceeds to step S67, and the communication control section 62 determines whether the link pin 21A has been removed.

When the communication control section 62 determines in step S67 that the link pin 21A has been removed, the processing returns to step S61, and the above-described processes are repeatedly performed. Contrarily, when the communication control section 62 determines that the link pin 21A has not been removed, the processing returns to step S64, and the subsequent processes are repeatedly performed.

When the communication control section 62 determines in step S66 that the reported Bluetooth device name includes the same group ID as that of the link pin 21A, the communication control section 62 sets the unit which reported the Bluetooth device name as a unit to be connected, and the processing proceeds to step S68.

In step S68, the communication control section 62 determines whether the individual ID of the link pin 21A inserted into the personal computer 4 is larger than the individual ID of the unit to be connected. When it is determined that the individual ID of its own (the link pin 21A) is larger, the processing proceeds to step S69, and a connection is made to the television receiver 5 as a Bluetooth master.

For example, when the link pin 21A is inserted into the personal computer 4, and the Bluetooth device name such as that described above has been reported from the television receiver 5, the communication control section 62 recognizes that the individual ID of the personal computer 4 is "01" and the individual ID of the television receiver 5 is "02".

Therefore, in this case, the communication control section 62 determines in step S68 that the individual ID of its own smaller than the individual ID of the television receiver 5, and the processing proceeds to step S70. The communication control section 62 connects to the television receiver 5 as a slave, and performs communications by Bluetooth. The television receiver 5 performs communications with the personal computer 1 by Bluetooth as the master.

The processes of step S71 to step S75 are basically the same as the processes of step S47 to step S51 shown in FIG. 10. More specifically, in step S71, the communication control section 62 determines whether the television receiver 5 has requested the release of the connection. When it is determined that the release of the connection has been requested, the processing proceeds to step S72, the connection is released, then, the processing returns to step S64, and the subsequent processes are repeatedly executed.

Contrarily, when the communication control section 62 determines in step S71 that the release of the connection has not been requested, the processing proceeds to step S73, and the communication control section 62 determines whether the link pin 21A has been removed. When the communication control section 62 determines that the link pin 21A has not been removed, the processing returns to step S71, and the subsequent processes are executed.

When the communication control section 62 determines in step S73 that the link pin 21A has been removed, the processing proceeds to step S74.

The communication control section 62 requests the television receiver 5 to release the connection in step S74, the processing proceeds to step S75, and the connection is released. Then, the processing proceeds to step S61, and the subsequent processes are repeatedly executed.

As described above, even when the management server 1 is not connected, units to which link pins having the same group ID are inserted can be connected to each other. In addition, even when the network 2 is a radio network such as a radio LAN and a Bluetooth, the user can easily understand connected units by referring to the colors of the inserted link pins.

The communication systems described above can be applied to various units. For example, when a server for distributing musical contents is located at a predetermined position in a house, and a speaker is provided for each room, the user can continue to listen to the music being distributed from the server even in a room to which the user has moved by carrying a link pin and inserting it into the speaker.

In this case, a link pin is always inserted into the server; when the user goes out of the room, the user pulls out the link pin inserted into the speaker of the room; and the user inserts the link pin into the speaker in the room where the user moves. The above described processing is executed every time when the link pin is removed and inserted. The output destination of the music being distributed from the server is changed to the speaker to which the link pin is newly inserted.

The user having no link pin cannot access the server. This condition can also be used as an access right. In other words, the server administrator distributes link pins having the same group ID as that of the link pin inserted into the server to only the users to which a connection to the server is allowed.

Figure 12A:
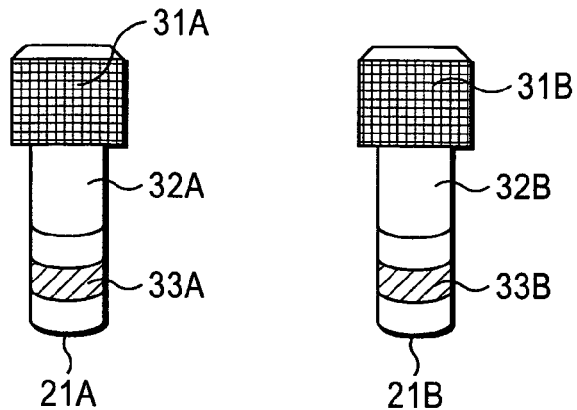
FIG. 12A is a perspective view showing another example appearances of link pins.
Figure 12B:
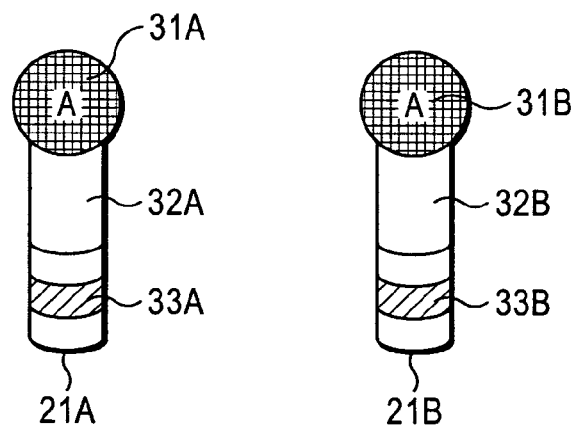
FIG. 12B is a perspective view showing still another example appearances of link pins.
Figure 12C:
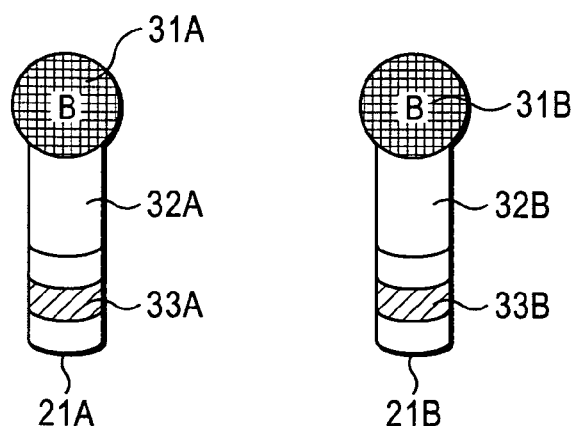
FIG. 12C is a perspective view showing example appearances of link pins.

In the above description, to identify the pair of the link pin 21A and the link pin 21B, and the pair of the link pin 22A and the link pin 22B, for example, the colors of the identification sections are used. As shown in FIG. 12A to FIG. 12C, they can also be identified by the shapes of the identification sections or characters printed on the identification sections.

The identification section 31A of the link pin 21A and the identification section 31B of the link pin 21B shown in FIG. 12A have an almost cubic shape. Connected units may be identified by the shape of the identification sections in this way.

On the identification section 31A of the link pin 21A and the identification section 31B of the link pin 21B shown in FIG. 12B, a character of "A" is printed. On the identification section 31A of the link pin 21A and the identification section 31B of the link pin 21B shown in FIG. 12C, a character of "B" is printed.

Therefore, when the four link pins shown in FIG. 12B and FIG. 12C are inserted into units, the user can easily recognize connected units by checking the characters printed on the identification sections.

Figure 13:
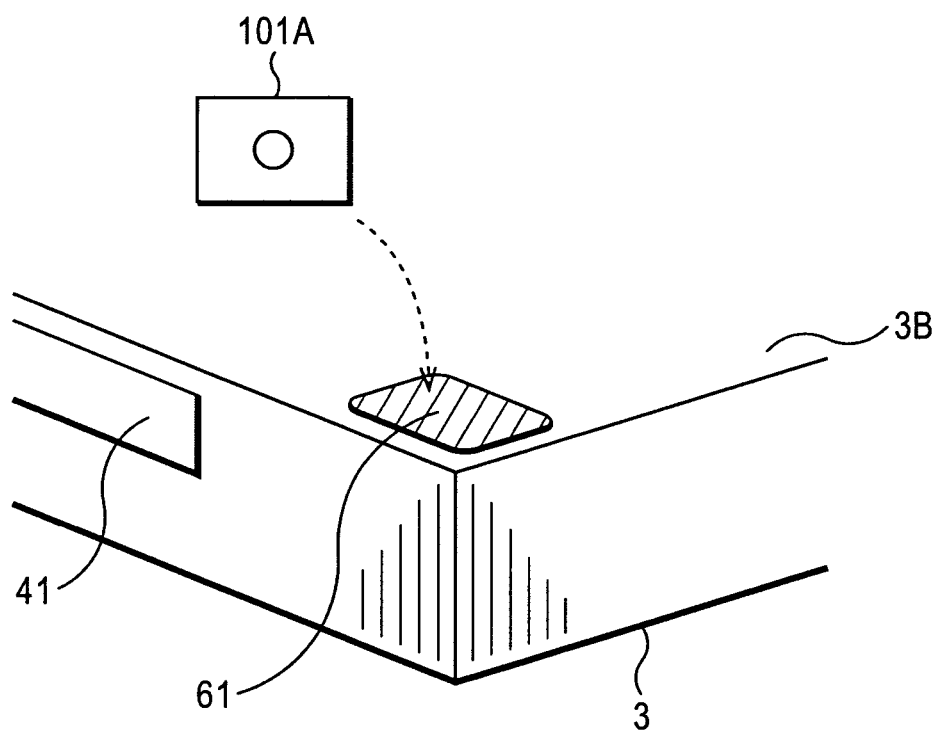
FIG. 13 is a perspective view showing an example appearance of a VCR on which a link card is placed.

A link pin itself may be made to have a card shape, as shown in FIG. 13.

FIG. 13 is a perspective view showing a part of the appearance of the VCR 3. To control a unit connection by using a link card 101A, a reader 61 such as that described above is provided, for example, at a corner of the upper surface 3B of the VCR 3.

Figure 14A:
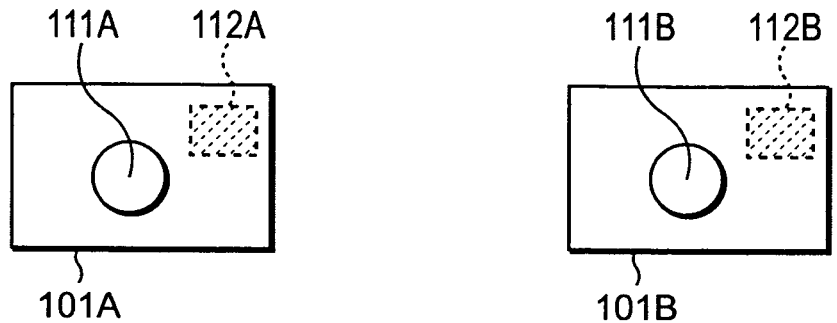
FIG. 14A is a view showing another example appearances of link cards.

FIG. 14A is a view showing example appearances of the link card 101A and a link card 101B to which the same group ID as to the link card 101A has been assigned.

As shown in the figure, for example, circles are drawn on the surfaces of the link card 101A and the link card 101B as an identification section 111A and an identification section 111B, respectively. An RF tag 112A and an RF tag 112B are disposed at the upper right of the link card 101A and at the upper right of the link card 101B, respectively, to manage the same group ID.

When the user wants to connect the VCR 3 and the television receiver 5, for example, the user places the link card 101A on the reader 61 of the VCR 3, and places the link card 101B on a reader provided at a predetermined position on the upper surface of the television receiver 5.

With this, the units read the card IDs (group IDs and individual IDs) stored in the RF tags of the link cards to establish a connection between the VCR 3 and the television receiver 5, as described above.

Figure 14B:
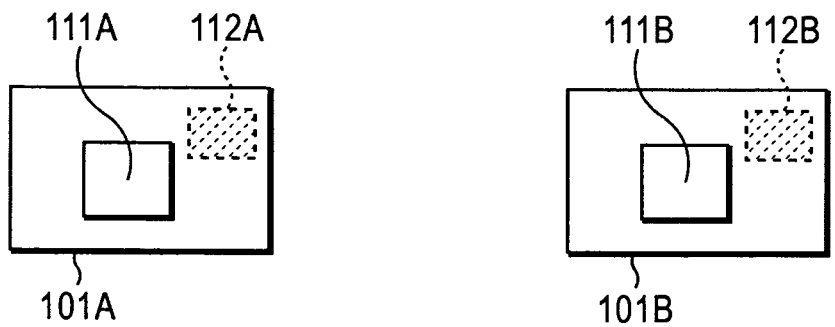
FIG. 14B is a view showing still another example appearances of link cards.
Figure 14C:
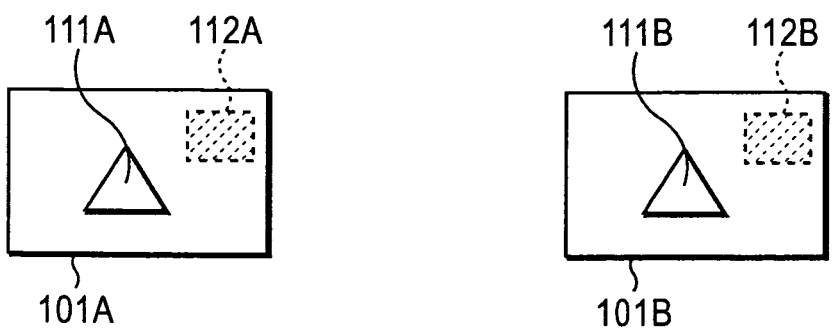
FIG. 14C is a view showing example appearances of link cards.

Link cards shown in FIG. 14B and FIG. 14C have different patterns on their identification sections from those of the link card 101A and the link card 101B shown in FIG. 14A.

On the identification section 111A of the link card 101A and the identification section 111B of the link card 101B shown in FIG. 14B, "squares" are drawn. On the identification section 111A of the link card 101A and the identification section 111B of the link card 101B shown in FIG. 14C, "triangles" are drawn.

In this way, the user can recognize connected units by checking the patterns drawn on the surfaces of link cards.

Not only pin-shaped and card-shaped objects, such as those described above, but also block-shaped objects can control connections. An RF tag may be built in a doll to control a connection.

Further, to allow connected units to be more easily recognized, LEDs (light emitting diodes), which emit predetermined-color light, may be provided for the identification sections of link pins or link cards.

In the above description, when a link pin is inserted to a unit, the unit connects to a mating unit immediately. The unit may connect to the mating unit according to an instruction of the user. In the above description, when a link pin is removed from the unit, a connection to the unit is released immediately. The connection to the unit may be released at predetermined timing, such as after predetermined data is sent or after an instruction is issued by the user.

In the above description, an RF tag provides identification information to the unit. Information corresponding to a group ID such as that described above may be provided by using a memory card such as a Memory Stick (registered trademark) or by using capacitance or resistance managed by a link pin.

The above-described series of processing can be executed not only by hardware but also by software.

When the series of processing is executed by software, a program constituting the software is installed from a network or a recording medium into a computer which is built in special hardware, or into a machine, such as a general-purpose personal computer, which can execute various functions by installing various programs.

The recording medium is formed not only of a package medium, such as the magnetic disk 81 (including a floppy disk), the optical disk 82 (including a CD-ROM (compact disk read only memory) and a DVD (digital versatile disk)), the magneto-optical disk 83 (including an MD (registered trademark, Mini Disk)), or the semiconductor memory 84, into which the program is recorded and which is distributed to provide the user with the program separately from the apparatus body, as shown in FIG. 5, but also of the ROM 72, or a hard disk included in the storage section 78 which records the program, which has been embedded in advance in the apparatus body, and which is provided for the user.

In the present specification, steps describing the program recorded in a recording medium include not only processing to be executed in a time-sequential manner in a described order but processing which is not necessarily executed time-sequentially but is executed in parallel or independently.

In the present specification, a system refers to an entire apparatus formed of a plurality of units.

INDUSTRIAL APPLICABILITY

As described above, according to the present invention, the user can easily and quickly start a connection, and can easily recognize connected information processing terminals.

The invention claimed is:

1. A physical server unit for managing communication for at least two client devices, comprising:
    a storage unit configured to store identification information that has been received from each of the at least two client devices, the identification information including alternative carrier information pertaining to alternate communication carrier circuits for establishing a connection between the at least two client devices which are not connected over a first wireless communication channel that is associated with the alternative carrier having the alternate communication carrier circuits; and
    a providing unit configured to provide, based on a determined commonality between the identification information received from each of the at least two client devices, the identification information stored by the storage unit over a second wireless communication channel, different from the first wireless communication channel that is associated with the alternative carrier, to one of the at least two devices so as to establish the connection between the at least two devices over the first wireless communication channel that is associated with the alternative carrier,
    wherein the storage unit and the providing unit are each implemented via at least one processor.

2. A communication method comprising:
    reading connection information, which includes alternative carrier information pertaining to alternate communication carrier circuits, for establishing a connection between a first device and a second device which are not connected over a first wireless communication channel that is associated with the alternative carrier having the alternate communication carrier circuits, from an electronic unit inserted into or placed on the first device;

transmitting the connection information over a second wireless communication channel to the second device, the second wireless communication channel being different from the first wireless communication channel that is associated with the alternative carrier; and establishing the connection between the first device and the second device over the first wireless communication channel that is associated with the alternative carrier based on the connection information transmitted over the second wireless communication channel and also based on a determined commonality between the connection information and an identification information transmitted from the second device.

3. The method of claim 2, wherein the electronic unit comprises a tag.

4. The method of claim 2, wherein the first wireless channel is in a bluetooth network.

5. The method of claim 2, wherein the first wireless channel is in a radio local area network.

6. The electronic unit of claim 1, wherein the first wireless channel is in a bluetooth network.

7. The electronic unit of claim 1, wherein the first wireless channel is in a radio local area network.

8. A non-transitory computer-readable medium storing a set of instructions which, when executed by a processor, cause the processor to perform a method comprising:

reading connection information, which includes alternative carrier information pertaining to alternate communication carrier circuits, for establishing a connection between a first device and a second device which are not connected over a first wireless communication channel that is associated with the alternative carrier having the alternate communication carrier circuits, from an electronic unit inserted into or placed on the first device;

transmitting the connection information over a second wireless communication channel to the second device, the second wireless communication channel being different from the first wireless communication channel that is associated with the alternative carrier; and establishing the connection between the first device and the second device over the first wireless communication channel that is associated with the alternative carrier based on the connection information transmitted over the second wireless communication channel and also based on a determined commonality between the connection information and an identification information transmitted from the second device.

9. The computer-readable medium of claim 8, wherein the electronic unit comprises a tag.

10. The computer-readable medium of claim 8, wherein the first wireless channel is in a bluetooth network.

11. The computer-readable medium of claim 8, wherein the first wireless channel is in a radio local area network.

12. A first device, attached to an electronic unit for communicating with a second device, the first device comprising:

a processor;

a memory including instructions that, when executed by the processor, cause the processor to control establishing a connection with the second device over a first wireless channel that is associated with an alternative carrier having alternate communication carrier circuits; and a communication unit configured to
receive connection information from the electronic unit;
receive identification information, which includes information of the alternative carrier pertaining to the alternate communication carrier circuits, of the second device via a second wireless channel different from the first wireless channel that is associated with the alternative carrier; and
establish a connection to the second device over the first wireless channel that is associated with the alternative carrier based on a determined commonality between the connection information received from the electronic unit and the identification information of the second device, wherein the communication unit is implemented via at least one processor.

13. The first device of claim 12, wherein the electronic unit comprises a tag.

14. The first device of claim 12, wherein the first wireless channel is in a bluetooth network.

15. The first device of claim 12, wherein the first wireless channel is in a radio local area network.

16. A second device for communicating with a first device, the second device comprising:

a processor;

a memory including instructions that, when executed by the processor, cause the processor to control establishing a connection with the first device over a first wireless channel that is associated with an alternative carrier having alternate communication carrier circuits;

a receiving unit for receiving connection information, which includes information of the alternative carrier pertaining to the alternate communication carrier circuits, and that is (i) stored in an electronic unit connected to the first device and (ii) transmitted from the first device via a server device over a second wireless channel different from the first wireless channel that is associated with the alternative carrier; and a connection unit for connecting to the first device over the first wireless channel that is associated with the alternative carrier based on the connection information and also based on a determined commonality between the connection information and an identification information associated with the second device, wherein the receiving unit and the connection unit are each implemented via at least one processor.

17. The second device of claim 16, wherein the electronic unit comprises a tag.

18. The second device of claim 16, wherein the first wireless channel is in a bluetooth network.

19. The first device of claim 16, wherein the first wireless channel is in a radio local area network.

* * * * *